April 20, 1937.  S. D. BUTTERWORTH  2,078,052
CAR LOADING DEVICE
Filed April 21, 1932
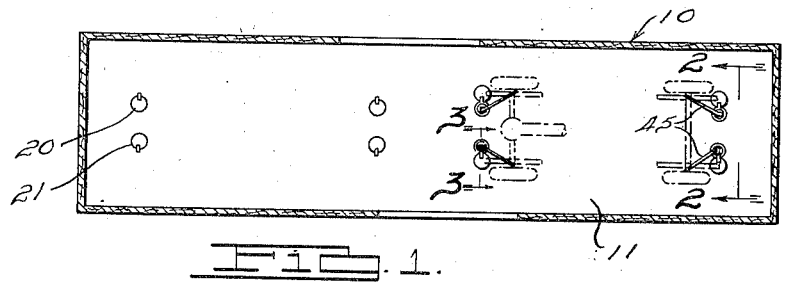
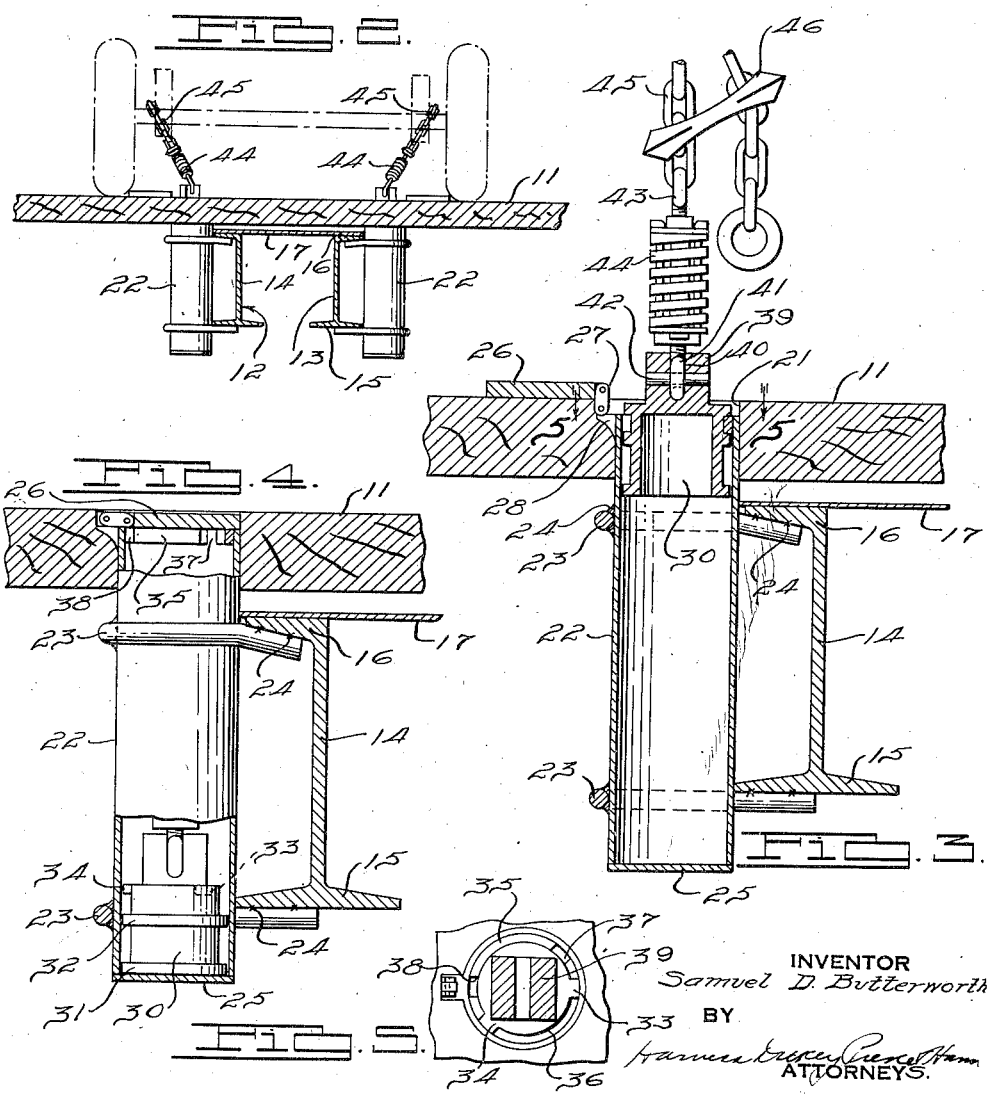
INVENTOR
Samuel D. Butterworth
BY
ATTORNEYS.

Patented Apr. 20, 1937

2,078,052

UNITED STATES PATENT OFFICE 2,078,052

CAR LOADING DEVICE

Samuel D. Butterworth, Detroit, Mich., assignor, by mesne assignments, of ninety-nine per cent to The Worth Company, a corporation of Michigan Application April 21, 1932, Serial No. 606,602

32 Claims. (Cl. 105—368)

The invention relates to loading devices and it has particular relation to devices for loading automobiles in freight cars or the like for transportation purposes.

In certain respects the invention is related to that embodied in my copending application for patent, Serial No. 586,318, filed January 13, 1932.

One object of the invention is to provide an improved form of loading device of the above mentioned character, which may be fastened to the beam usually provided below the floor of the freight car.

Another object of the invention is to provide an improved type of car loading device which permits the use of a housing well below the floor of the freight car, of relatively small cross-sectional dimensions from which it follows that the housing may be manufactured less expensively, and openings in the floor of the freight car for rendering the loading devices in the housing means accessible, may be smaller so as to require less alteration of the floor.

And in general it is an object of the invention to provide improved means for securing vehicles or the like in freight cars, which require little space, involve minimum expense for construction and installation, which are extremely strong and rigid for preventing any undesirable movement of the vehicle in the freight car, and which have minimum interference with the freight car floor surface and floor construction.

For a better understanding of the invention, reference may be had to the accompanying drawing forming a part of the specification, wherein:

Figure 1 is a longitudinal cross-sectional view, in plan, of a freight car having car loading devices constructed according to one form of the invention.

Fig. 2 is a cross-sectional view on a larger scale, taken substantially along the line 2—2 of Fig. 1;

Fig. 3 is a cross-sectional view on a larger scale, taken substantially along the line 3—3 of Fig. 1;

Fig. 4 is a view similar to that shown by Fig. 3 but illustrating the loading device housed below the freight car floor, in the housing means provided for this purpose;

Fig. 5 is a cross-sectional view taken substantially along the line 5—5 of Fig. 3.

Referring to Fig. 1, the walls of the freight car are indicated at 10 and the floor thereof at 11. Normally, and as shown by Fig. 2, a box girder 12 will extend longitudinally under the floor 11, substantially centrally thereof, and this girder may comprise laterally spaced beams 13 and 14 each of which has an I beam flange 15 at its lower edge, and an angle iron flange 16 at its upper edge, the angle iron flanges projecting outwardly from the remotely spaced sides of the beams. Of course, other types of beams may be employed for this purpose and the beam illustrated is merely exemplary. The beams are connected at their upper edges, by a plate 17 connected as by welding to the upper surfaces of the flanges 16 so that a unitary girder is provided under the floor.

At longitudinally spaced points, the floor 11 is provided as best shown by Figs. 1, 3 and 4, with pairs of circular openings 20 and 21, the openings 20 being located at one side of the girder 12 and the openings 21 at the other side of the girder. In the particular arrangement illustrated, four pairs of such openings are utilized, two pair in each longitudinal half of the car, although it should be understood that the number of pairs provided may be varied as found desirable. Into each of the openings, a housing well 22 of cylindrical character, is dropped into position adjacent the girder 12 and then is fastened to the beam of such girder, adjacent thereto, by means of strap rods 23 extending around the well and being welded thereto and to the flanges 15 and 16 as indicated at 24. The bottom of the well is closed by a plate 25, and the upper edge of the well terminates below the upper surface of the floor 11 to provide a space for a metal lid 26 hinged, as indicated at 27, to a metal element 28 disposed at one side of the opening in the floor. If desired, the element 28 may be integral with the well, and in certain ways this would be advantageous, in that the element would be helpful in limiting downward movement of the well into approximately its proper position so that the straps 23 might be welded thereto without requiring manual support of the well.

Each well houses a reciprocatory, piston-like, anchoring element 30 having a lower, annular rib 31 corresponding substantially to the inner diameter of the well, an intermediate rib 32 of similar character, and at its upper edge, circumferentially spaced, radially directed lugs 33 and 34. As best shown by Figs. 3, 4 and 5, a circumferentially directed segment or collar 35 is welded or otherwise secured to the inner surface of the well at its upper edge, and a similar but circumferentially longer segment or collar 36 is similarly secured to the inner surface of the well in a radial plane of the segment 35, but in such manner that circumferentially spaced slots 37 and 38 are provided between the edges of the segments. The circumferential distances between these slots correspond to the circumferential distance between the lugs 33 and 34 but it will be noted that the distance in one circumferential direction is greater than a semi-circle and less than a semi-circle in the other direction. As the parts are positioned in Fig. 5, it will be seen that if the piston-like element 30 is turned through an angle of 180 degrees, the lugs 33 and 34 will coincide with the slots 37 and 38. Such element initially is inserted in the cylinder prior to inserting and securing the segments 35 and 36 to the inner wall of the cylinder, although it might be feasible to weld the segments in place first and insert the piston element from the bottom side of the cylinder and then apply the bottom 25 by welding or the like. After the piston element is in the cylinder, it is apparent that it may be moved to the upper end thereof and then by coinciding the lugs 33 and 34 with the slots 37 and 38, the lugs may be moved upwardly and out of the slots and then by turning the element the lugs may be disposed in engagement with the upper surfaces of the segments 35 and 36 and such arrangement in combination with the intermediate rib 32, positively locks the piston element in its elevated position. Particularly in view of the fact that the lugs 33 and 34 normally will be arranged in 180 degrees spaced relation to the slots, it is evident that when the piston element is so positioned, there will be little chance for the lugs to accidentally be brought into alignment with the slots.

The upper surface of the piston element 30 is provided with a block 39 having a vertically arranged slot 40 for receiving one end of an eye bolt 41. The eye bolt is pivotally arranged in the slot by means of a pin 42 extending laterally through the block and through the eye portion of the bolt. This bolt, the eye member 43, the helical spring 44 and associated parts constitute an adjustable, resilient connection. Such connection may be constructed, if desired substantially like the resilient connection disclosed in the copending application for patent of Leo I. Friedlaender, Serial No. 580,380, filed December 11, 1931. The element 43 is connected to a flexible chain 45 which is adapted to be slung around an end portion of the vehicle axle and then to have its free end portion connected to the first part of the chain by means of a suitable, releasable hook 46 which may, for instance, comprise a body having hook end portions, one portion adapted to engage one part of the chain and another portion to engage another part of the chain. It is, of course, apparent that the end of the chain might have an eye hook adapted to engage a link or between links in the first part of the chain, or that various other connections might be employed to connect the parts of the chain together after it has been slung around an axle.

The invention may be utilized, as shown in Fig. 1, by employing two of the loading devices or rather a pair at opposite sides of the girder, for holding one axle of the vehicle, and another pair for holding the other vehicle axle. Preferably, the axles of the vehicle will be disposed between the two pairs mentioned and the distance between each pair will be such that the chains thereof will diverge toward the ends of the axle. It is evident that the chain is rigidly anchored in the housing means and hence to the floor of the car and girder, owing to the rigidity of the housing well, and the engagement of the rib 32 on the piston element with the segments 35 and 36 of such well. Moreover the sides of the ribs on the element engaging the sides of the well, further increase the rigidity of the anchor and it is apparent that once the element 30 is positioned as shown in Fig. 3, it can move neither upwardly nor downwardly nor laterally to any appreciable extent, to affect the permanency of the anchor. Furthermore, it is apparent that this piston element can turn considerably without bringing the lugs 33 and 34 into alignment with the slots 37 and 38, and this feature in conjunction with the pivotal arrangement of the eye bolt 41 in the slot 40, permits desirable flexibility and variation in position of the anchor.

When the device is not to be used, it is apparent that the piston element can be turned until the lugs 33 and 34 move downwardly into the slots 37 and 38, and then the element may move to the bottom of the housing well as shown by Fig. 4 and the chain connection may be disposed in the housing well thereabove. Following so arranging the anchoring means in the housing well, the lid 26 may be closed and the floor of the freight car will, with minimum interruption, have a smooth and flush appearance and may be used for various ordinary purposes.

One of the advantages of the invention is that the loading device can be associated with any standard freight car with minimum expense and effort and the device permanently and rigidly arranged. Practically all that is necessary, is to cut circular holes in the floor in the manner shown, then slip the housing wells with the anchoring devices arranged therein, down through the holes until they are properly positioned with respect to the girder and then to connect them to the girder by means of the straps and welds. Furthermore, it is a very simple matter to lift the anchoring device from the housing well to its position shown by Fig. 3 so that it may be used, and it is impossible to entirely remove the piston element from the well, so that the arrangement is permanent.

Although only one form of the invention has been shown and described in detail, it will be apparent to those skilled in the art that various modifications may be made without departing from the scope of the appended claims.

I claim:

1. In combination, a freight car or the like having an opening in the floor thereof, a vertical tube projecting below the surface of the floor of the car and fastened relative to the latter, an anchoring element mounted for vertical sliding movement in said tube, and means connected to said anchoring element and accessible through the opening in the floor for anchoring a vehicle or the like in the car.

2. In combination, a freight car or the like having an opening in the floor thereof, a housing well projecting below the floor of the car and fastened relative to the latter, an anchoring element mounted in such well for vertical sliding movement, means for limiting upward movement of the element in the well, and means connected to the element and accessible through the opening in the floor for anchoring a vehicle or the like in the car.

3. In combination, a freight car or the like having an opening in the floor thereof, a housing well projecting below the floor of the car and fastened relative to the latter, a vertically reciprocatory piston in said well, and means connected to the piston and accessible through the opening in the floor for anchoring a vehicle or the like in the car.

4. In combination, a freight car or the like having an opening in the floor thereof, a rigid housing well projecting below the floor of the car and fastened relative to the latter, a vertically slidable anchoring element in the well, means connected to the element and accessible through the opening in the floor for anchoring a vehicle or the like in the car, and means in the upper part of the well for normally preventing removal of the element during use.

5. In combination, a freight car or the like having an opening in the floor thereof, a rigid housing well projecting below the floor of the car and fastened relative to the latter, a vertically movable anchoring element in the well, means connected to the element and accessible through the opening in the floor for anchoring a vehicle or the like in the car, and means for releasably locking the element at the upper end of the well against movement in either vertical direction.

6. In combination, a freight car or the like having an opening in the floor thereof, a housing well projecting below the floor of the car and fastened relative to the latter, a vertically movable anchoring element in the well, means connected to the element and accessible through the opening in the floor for anchoring a vehicle or the like in the car, and means in the upper part of the well for normally preventing removal of the element during use, said means being so located that, during use, the element substantially closes the opening in the floor.

7. In combination, a freight car or the like having openings in the floor thereof, a girder extending longitudinally under the floor of the car, pairs of vertical tubes fastened to the car and spaced longitudinally of the girder respectively, the tubes of each pair being disposed at opposite sides of the girder, and flexible means housed by each tube and accessible through said openings in the floor, for anchoring a vehicle or the like in the car.

8. In combination, a freight car or the like having an opening in the floor thereof, a girder extending longitudinally under the floor, pairs of tubes spaced longitudinally of the girder respectively, the tubes of each pair being disposed at opposite sides of the girder, means securing each tube to the girder, and means housed by each tube and accessible through the opening in the floor for anchoring a vehicle or the like in the car.

9. In combination, a housing well having a circumferentially extending shoulder segment on its inner surface, an anchoring element movable in the well and having a segmental shoulder for engaging the outer side surface of the first shoulder and a shoulder for engaging the inner side surface of the first shoulder, said segmental shoulders permitting downward movement of the element by turning thereof.

10. In combination, a freight car or the like, a beam extending under the floor, a housing well disposed laterally beside the beam, means disposed in said well and extending through the floor for anchoring objects within the car, and means connecting the well to the beam, comprising a strap encircling the well and secured to the beam.

11. In combination, a freight car or the like, a beam extending under the floor, and means including a rigid cylindrical well connected to the beam and the interior thereof accessible through an opening in the floor of the car, for holding objects in the car against substantial movement.

12. In combination, a freight car or the like, a beam extending under the floor of the car, a tubular well projecting downwardly below the floor of the car adjacent the beam, means rigidly connecting the well to the beam, said floor having an opening exposing an end of the well, and means within and engaging the side walls of the well and adapted to extend through the opening in the floor to anchor objects in the car in such manner that the anchor load stress is carried by the beam.

13. In combination, a freight car or the like, a beam extending under the floor of the car, a tubular well projecting downwardly below the floor of the car adjacent the beam, straps encircling the well and welded thereto and to the beam, said floor having an opening exposing an end of the well, and means within the well and operatively connected thereto and adapted to extend through the opening for holding objects in the car.

14. In combination, a freight car or the like, having an opening in the floor thereof, a tubular well projecting downwardly below the floor in alignment with the opening, means connecting the well to the frame of the car, an anchor element in the well, means releasably connecting the element to a wall of the well, and means connected to the element and adapted to extend through the opening in the floor for connecting a vehicle or the like thereto.

15. In combination, a freight car or the like having an opening in the floor thereof, a tubular well projecting downwardly below the floor in alignment with the opening, means connecting the well to the frame of the car, a reciprocatory anchor element in the well, means connected to the element and extensible through the opening, and means adapted to releasably connect the element to the upper end of the well adjacent the opening, but allowing the element to be moved downwardly in the well to accommodate the extensible means, when the latter is not in use.

16. In combination, a freight car or the like having an opening in the floor thereof, a beam extending under the floor adjacent the opening, a cylindrical well projecting downwardly in a vertical direction below the floor in alignment with the opening, means connecting the well to the beam, a vertically reciprocatory member in the well, means adapted to releasably connect the reciprocatory member to the upper end of the well, and extensible means connected to the reciprocatory member for extending above the floor and holding a vehicle or the like therein, said reciprocatory member being movable to the lower portion of the well when the device is not in use.

17. In combination, a freight car or the like having an opening in the floor thereof, a beam extending under the floor adjacent the opening, a cylindrical well projecting downwardly in a vertical direction below the floor in alignment with the opening, means connecting the well to the beam, a vertically reciprocatory and rotatable member in the well, means adapted to releasably connect the reciprocatory member to the upper end of the well, and extensible means connected to the reciprocatory member for extending above the floor and holding a vehicle or the like therein, said reciprocatory member being movable to the lower portion of the well when the device is not in use, the means connecting the reciprocatory member to the upper end of the well being of such character as to permit said movement of the reciprocatory element when turned into one position.

18. In combination with a freight car floor or the like provided with an opening, a beam extending under the floor, a housing well operatively connected to the beam under the floor and extending upwardly through the opening, and means operatively engaging the well for anchoring objects in the car, said well being adapted to store said means when the latter is not in use.

19. In combination with a freight car floor or the like provided with an opening in the floor thereof, a beam extending under the floor adjacent the opening, means for anchoring objects in the car including a tubular metal well extending adjacent the beam and opening and adapted to store the rest of said means when not in use, and means weldingly connecting the well to the beam.

20. An article of manufacture for use in car loading devices, comprising a tubular well closed at one end and open at its other end and which is adapted to be inserted in an opening in a freight car wall, means within the well and adapted to extend through the open end thereof and through the opening in the wall for holding an object in the car, and means on said well adjacent said open end for positioning said well in said opening.

21. An article of manufacture for use in car loading devices, comprising a tubular well adapted to be inserted in an opening in a freight car wall, means within the well and adapted to extend through the end thereof opposite the initially insertable end and through the opening in the wall for holding an object in the car and a cover on said first end of the well for closing it and the opening in the wall.

22. An article of manufacture for use in car loading devices, comprising a tubular well adapted to be inserted in an opening in a freight car wall, means within the well and adapted to extend through the end thereof opposite the initially insertable end and through the opening in the wall for holding an object in the car and a cover pivoted on said first end of the well and having its pivot portion so disposed as to limit movement of the well through the opening.

23. An article of manufacture to be used in car loading devices comprising a tubular well adapted to receive an anchoring element movable in the well, means on one end of the well for normally preventing removal of the element therefrom, and means on the other end of the well serving as an anchoring abutment for preventing displacement of the element in either direction longitudinally in the well.

24. An article of manufacture to be used in car loading devices comprising a tubular well adapted to receive an anchoring element movable in the well, means on one end of the well for normally preventing removal of the element therefrom, means on the other end of the well serving as an anchoring abutment for the element, and a cover pivotally mounted on the latter end of the well for closing such end.

25. An article of manufacture to be used in car loading devices comprising a tubular well adapted to receive an anchoring element movable in the well, and means on one end of the well for normally preventing removal of the element therefrom, and circumferentially segmental means on the other end of the well serving as an anchoring abutment for preventing displacement of the element in either direction longitudinally in the well.

26. An article of manufacture for use in a car loading device comprising an anchoring element in the form of a piston slidably disposed in a tubular well, and anchoring means pivotally connected to the element and extensible into the interior of the car for supporting an object disposed in said freight car, said piston being rotatably disposed in said well for providing operativeness of said anchoring means in any direction in the car.

27. An article of manufacture for use in a car loading device comprising an anchoring element in the form of a piston adapted to be rotatably disposed in a tubular well, a chain connected to the element and adapted to be connected to an object to be held in a freight car, and cushioning means forming a part of the device and serving to cushion the holding of the object.

28. An article of manufacture for use in a car loading device comprising an anchoring element in the form of a piston adapted to be slidably disposed in a tubular well, anchoring means connected to the element and adapted to be connected to an object to be held in the freight car, and circumferentially segmental means on the piston adapted to co-operate with circumferentially segmental means on the interior of the well so as to hold the piston in a releasably anchored position.

29. In combination, a housing well having a circumferentially extending shoulder segment on its inner surface, an anchoring element movable in the well and having a segmental shoulder for engaging the outer side surface of the first shoulder and a shoulder for engaging the inner side surface of the first shoulder, said segmental shoulders permitting a partial restricted removal of said element from the top of the well when the element is turned in the well.

30. In combination, a housing well having a circumferentially extending shoulder segment on its inner surface, an anchoring element movable in the well and having a segmental shoulder for engaging the outer side surface of the first shoulder and a circumferential shoulder spaced from and below said segmental shoulder, said shoulders being so constructed and arranged as to permit said anchoring element to be partially removed from the top of the well and to be retained in such position by turning said element relative to said well.

31. An article of manufacture to be used in car loading devices, comprising a tubular well, piston means therein, and means on both ends of the well normally preventing removal of said piston means therefrom, one of said means serving to anchor said piston means at a position adjacent that end against displacement longitudinally in the well.

32. An article of manufacture to be used in car loading devices, comprising a well receiving a piston means therein, means adjacent both ends of the well normally preventing removal of said piston means from the well, and means for anchoring said piston means at a position adjacent one end of the well against displacement in the well.

SAMUEL D. BUTTERWORTH.